(12) United States Patent
Liu

(10) Patent No.: US 12,373,254 B2
(45) Date of Patent: Jul. 29, 2025

(54) DRIVER SYSTEM, INFORMATION PROCESSING METHOD, ELECTRONIC DEVICCE AND STORAGE MEDIUM

(71) Applicant: GUANGDONG OPPO MOBILE TELECOMMUNICATIONS CORP., LTD., Guangdong (CN)

(72) Inventor: Jun Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 481 days.

(21) Appl. No.: 18/090,923

(22) Filed: Dec. 29, 2022

(65) Prior Publication Data

US 2023/0137415 A1 May 4, 2023

Related U.S. Application Data

(63) Continuation of application No. PCT/CN2021/103063, filed on Jun. 29, 2021.

(30) Foreign Application Priority Data

Jul. 28, 2020 (CN) .......................... 202010739377.4

(51) Int. Cl.
G06F 9/50 (2006.01)
G06F 9/54 (2006.01)
G06F 12/10 (2016.01)

(52) U.S. Cl.
CPC ............ *G06F 9/5016* (2013.01); *G06F 9/544* (2013.01); *G06F 12/10* (2013.01)

(58) Field of Classification Search
None
See application file for complete search history.

(56) References Cited

U.S. PATENT DOCUMENTS 5,984,499 A 11/1999 Nourse et al.
8,886,867 B1 11/2014 Bolt
(Continued)

FOREIGN PATENT DOCUMENTS

CN 102629202 A 8/2012
CN 103425592 A 12/2013
(Continued)

OTHER PUBLICATIONS

Ecker, Wolfgang et al., "Hardware-dependent Software Principles and Practice", Springer, pp. 1-295 (Year: 2009).*
(Continued)

*Primary Examiner* — Taelor Kim
(74) *Attorney, Agent, or Firm* — Young Basile Hanlon & MacFarlane, P.C.

(57) ABSTRACT

A drive system includes: an application programming interface layer of an upper-layer application, for providing a generic first application programming interface, and in the case that the upper-layer application requests access to a memory, receiving a first structure body fed back by a driver hardware abstraction layer; the driver hardware abstraction layer, for achieving the communication function of the first application programming interface to obtain memory information of the memory, and encapsulating the memory information to obtain the first structure body; a memory allocation management layer, for determining a target memory pool among shared memory pools, dividing the memory requested by the upper-layer application, and allocating the memory to the upper-layer application; an application programming interface layer of hardware, for obtaining the first structure body, obtaining the memory information, and transmitting the memory information to a hardware device.

20 Claims, 3 Drawing Sheets

(56) References Cited

U.S. PATENT DOCUMENTS

| | | |
|---|---|---|
| 2007/0198997 A1 | 8/2007 | Jacops et al. |
| 2008/0196043 A1 | 8/2008 | Feinleib et al. |
| 2009/0138625 A1 | 5/2009 | Lee et al. |
| 2012/0084792 A1 | 4/2012 | Benedek et al. |
| 2023/0214251 A1* | 7/2023 | Jing .................... G06F 9/45558 718/1 |

FOREIGN PATENT DOCUMENTS

| | | |
|---|---|---|
| CN | 104572165 A | 4/2015 |
| CN | 106293966 A | 1/2017 |
| CN | 106406977 A | 2/2017 |
| CN | 110413264 A | 11/2019 |
| CN | 110413327 A | 11/2019 |
| CN | 111857852 A | 10/2020 |
| WO | 2020119316 A1 | 6/2020 |

OTHER PUBLICATIONS

Extended European Search Report for EP Application 21850601.2 mailed Oct. 2, 2023. (9 pages).
International Search Report and Written Opinion with English Translation for PCT Application PCT/CN2021/103063 mailed Sep. 27, 2021. (13 pages).
Chinese First Office Action with English Translation for CN Application 202010739377.4, mailed Dec. 2, 2021. (10 pages).
Chinese Notification to Grant Patent Right for Invention with English Translation for CN Application 202010739377.4, mailed Feb. 18, 2022. (7 pages).
Huacan et al., "Component driver based for flexible kernel", Small microcomputer system, vol. 25, Issue 4, Apr. 29, 2004. (587-590 pages).
Gao Ke et al., "Research on resource allocation and management of shared memory in multi-core systems", Journal of Computer Science, vol. 38, Issue 5, May 31, 2015. (1020-1034 pages).

* cited by examiner

DRIVER SYSTEM, INFORMATION PROCESSING METHOD, ELECTRONIC DEVICCE AND STORAGE MEDIUM

CROSS REFERENCE TO RELATED APPLICATIONS

This application is continuation application of the International patent application No. PCT/CN2021/103063, filed on Jun. 29, 2021, which claims priority to Chinese Patent Application No. 202010739377.4, filed on Jul. 28, 2020, the contents of both of which are herein incorporated by reference in their entireties.

TECHNICAL FIELD

The present disclosure relates to the field of computer software systems, and in particular to but not limited to a driver system, an information processing method, an electronic device and a storage medium.

BACKGROUND

At present, general artificial intelligence (AI) chips are mainly configured in a mobile phone side and a server side. A hardware device is also known as an AI accelerator or a computing card. The hardware device is an application specific integrated circuit (ASIC) for AI algorithms, and is specially configured to perform a large amount of computing tasks in AI applications.

However, a user of the hardware device, such as a mobile phone manufacturer, need to design corresponding driver programs for various system platforms and various hardware devices.

SUMMARY OF THE DISCLOSURE

A driver system, an information processing method, an electronic device, and a non-volatile computer-readable storage medium provided in the embodiments of the present disclosure may be achieved by the following operations.

A driver system, including: an application programming interface layer of an upper application, configured to: provide a general first application programming interface to be invoked by the upper application, obtain a first structure, which is fed back from a driver hardware abstraction layer, in response to the upper application requesting to access a memory, the first structure is configured to locate a memory region, which is in a shared memory pool of a memory allocation management layer and corresponds to a memory allocated to the upper application; the driver hardware abstraction layer, configured to: implement a communication capability of the first application programming interface, obtain memory information of the memory allocated to the upper application, and package the memory information to obtain the first structure; a memory allocation management layer, configured to: determine a target memory pool in the shared memory pool, determine the memory requested by the upper application from the target memory pool, and allocate the memory to the upper application; and the application programming interface layer of the hardware, configured to: obtain the first structure, obtain the memory information included in the first structure, and send the memory information to a hardware device, allowing the hardware device to process data in the target memory pool indicated by the memory information.

An information processing method, applied in the driver system, including: obtaining, by the driver hardware abstraction layer, the memory information of the memory allocated to the upper application and packaging, by the driver hardware abstraction layer, the memory information to obtain the first structure, when the upper application invokes the first application programming interface of the application programming interface layer to request to access the memory; the first structure is configured to locate the memory region, which is in a shared memory pool of a memory allocation management layer and corresponds to a memory allocated to the upper application; obtaining, by the application programming interface layer of the hardware, the first structure, and obtaining the memory information included in the first structure; and sending, by the application programming interface layer of the hardware, the memory information to a hardware device, and allowing the hardware device to process data in a target memory pool indicated by the memory information.

An electronic device, including a processor and a memory, the memory stores computer programs that can be run on the processor, and the computer program includes the driver system.

A non-volatile computer-readable storage medium, the non-volatile computer-readable storage medium stores the driver system.

DETAILED DESCRIPTION

Figure 1:
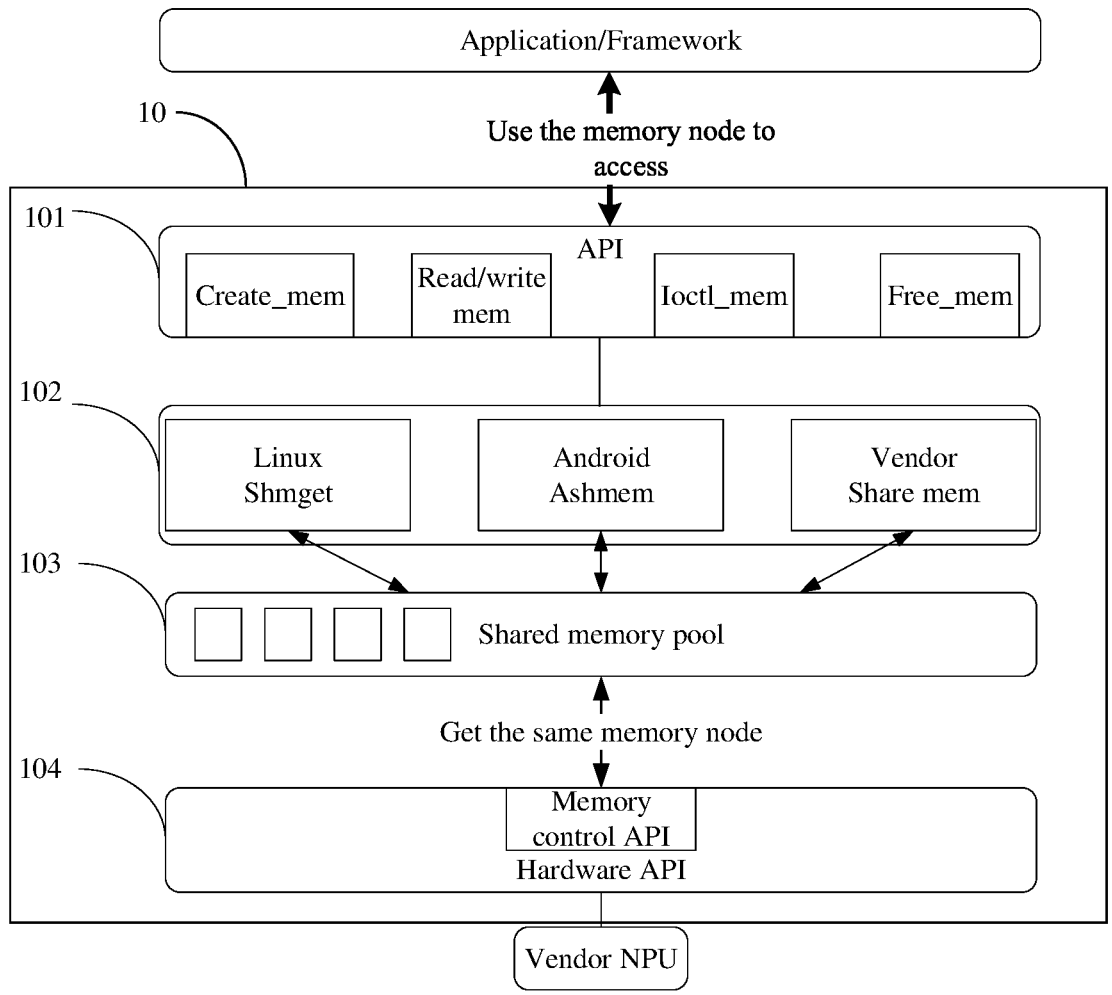
FIG. 1 is a structural schematic view of a driver system according to an embodiment of the present disclosure.

In order to allow the objects, features and advantages of the present disclosure to be more obvious, technical solutions of the embodiments of the present disclosure will be clearly and completely described below by referring to the accompanying drawings in the embodiments of the present disclosure. The specific embodiments described herein are intended to explain the present disclosure only and are not intended to limit the present disclosure.

Unless otherwise specified, the technical solution and the scientific terminology used herein may have the same meanings as commonly understood by those skilled in the technical field of present disclosure. The terms disclosed herein are intended to explain the present disclosure only and shall not be interpreted as limiting the scope of the embodiments of the present disclosure.

In following description, the term "some embodiments" describes a subset of all possible embodiments. However, it should be understood that, the term "some embodiments" may be a same subset or different subsets of all possible embodiments, and the embodiments may be combined with each other without conflict.

It should be noted that, terms "first", "second" and "third" in the present disclosure are used for distinguishing similar or different objects only, and shall not be interpreted as a specific order of objects. It should be understood that, a specific order or sequence of the terms "first", "second" and "third" in the present disclosure may be interchanged, and the embodiments of present disclosure described herein may be implemented in an order other than that illustrated or described herein Unless otherwise specified, the technical solution and the scientific terminology used herein may have the same meanings as commonly understood by those skilled in the technical field of present disclosure. The terms disclosed herein are intended to explain the present disclosure only and shall not be interpreted as limiting the scope of the embodiments of the present disclosure.

The terms and expressions involved in the embodiments of the present disclosure may be illustrated before the embodiments of the present disclosure is further illustrated in detail. The terms and expressions involved in the embodiments of the present disclosure may be applicable to the following explanations.

1) Artificial intelligence (AI): An AI chip may mimic a neural network structure of the human brain. Processing of a group of neurons may be completed based on one instruction. This calculation mode is hundreds of times more efficient than a traditional chip when performing intelligent processing such as image recognition, and the like. The AI chips have been widely used in image recognition, speech recognition, intelligent security, intelligent driver, consumer electronics, and the like. The advent of an intelligent cloud chips will provide a new technical support for complex cloud-based intelligent processing requirements such as large data amount, multi-tasking and high throughput.

2) Machine learning (ML) may be configures to research how a computer may mimic or achieve a human learning behavior to acquire new knowledge or skills. The ML may reorganize a known knowledge structure to continuously improve the performance of the machine.

3) An interprocess communication (IPC) may be a set of programming interfaces, and allows programmers to coordinate different processes, such that the different processes may run simultaneously in one operating system and may transfer and exchange information with each other.

4) An application Programming Interface (API) is known as an application programming interface, and may be a convention that various components of a software system are interfacing with each other.

5) An hardware abstraction layer (HAL) may be configured to abstract the hardware.

6) A neural network processing unit (NPU) is configured with a "data-driven parallel computing" system, and may be good at processing massive amount of multimedia data such as videos and images.

7) A binder service is a process to process communication method defined by Android.

8) A direct memory access (DMA) may be a fast memory access device without CPU.

9) A memory pool is a method of unifying memory management. A memory to be used may be requested and reclaimed from the memory pool. The memory pool is a pool configured to manage memories, and supports dynamic content management.

In the art, the binder has been applied as the interprocess communication mode since Android 9 of the Android system. Android may need to support a plurality of software devices and hardware devices, and applying the binder communication mode allows system resources to be managed universally. However, application scenarios of AI chips may be limited when the binder communication mode is applied. At present, the driver system of the AI chips may be implemented based on binder communication mode in order to access the Android system. However, multiple data movements may be occurred in a date path when the binder communication mode is applied. Overhead may be increased, and an efficiency may be reduced for application scenarios with a large amount of the data streams, such as AI chip application scenarios.

Up to now, a plurality of driver communication modes has been proposed for Linux, and each driver communication mode may have advantages and disadvantages. At present, manufactures have various IPC modes to be used by Linux-based AI chip driver application. Linux defines a plurality of communication modes, and a unified system is absent. Therefore, when a new AI chip are accessed, a new driver system and a new communication mode may be developed, such that development costs may be increased.

The user of the AI chips, such as a mobile phone manufacturer, may design different driver systems for different system platforms and AI chips where the different communication modes may be applied. A significant amount of research costs may be invested, and a continuous high investment may be cost for updating the hardware and software at a later stage.

The present disclosure provides a driver communication mode, which is compatible for various platforms and has a high efficiency. The driver communication mode may be configured on an AI chip for deploying softwares.

The present disclosure provides a driver system configured to achieve communication between an upper application and at least one hardware device.

The driver system provided in the present disclosure, including:

the application programming interface layer of the upper application, configured to: provide the general first application programming interface to be invoked by the upper application, obtain the first structure, which is fed back from the driver hardware abstraction layer, in response to the upper application requesting to access the memory, the first structure is configured to locate a memory region, which is in a shared memory pool of a memory allocation management layer and corresponds to the memory allocated to the upper application;

the driver hardware abstraction layer, configured to: implement the communication capability of the first application programming interface, obtain memory information of the memory allocated to the upper application, and package the memory information to obtain the first structure;

the memory allocation management layer, configured to: determine a target memory pool in the shared memory pool, determine the memory requested by the upper application from the target memory pool, and allocate the memory to the upper application;

the application programming interface layer of the hardware, configured to: obtain the first structure, obtain the memory information included in the first structure, and send the memory information to a hardware device, allowing the hardware device to process data in the target memory pool indicated by the memory information.

In above technical solutions, the first structure stores a mapping relationship between a virtual address and a physical address, the virtual address is used by the upper application to access the memory allocated to the upper application, and the physical address is used by the hardware device to access the memory allocated to the upper application.

In above technical solutions, the application programming interface layer is further configured to provide a second application programming interface to be invoked by the upper application to view the memory information included in the first structure.

In above technical solutions, the first application programming interface may include at least the following.

A requesting interface of the memory is configured to support a requesting operation performed on the memory by the hardware;

A read-write interface of the memory is configured to support a reading and writing operation performed on the memory by the hardware device;

A release interface of the memory is configured to support a releasing operation performed on the memory by the hardware device.

In above technical solutions, while packaging the memory information to obtain the first structure, the driver hardware abstraction layer is configured to: obtain a second structure associated with attribute information of an operating system; package the second structure to obtain the first structure, the memory information is packaged in the second structure.

In above technical solutions, the attribute information represents a memory management mode of the operating system.

In above technical solutions, the application programming interface layer of the hardware provides an interprocess communication interface to obtain the first structure.

In above technical solutions, the hardware device is an artificial intelligence chip.

An information processing method, applied in the driver system, including:
   obtaining, by the driver hardware abstraction layer, the memory information of the memory allocated to the upper application and packaging, by the driver hardware abstraction layer, the memory information to obtain the first structure, when the upper application invokes the first application programming interface of the application programming interface layer to request to access the memory; the first structure is configured to locate the memory region, which is in a shared memory pool of a memory allocation management layer and corresponds to a memory allocated to the upper application;
   obtaining, by the application programming interface layer of the hardware, the first structure, and obtaining the memory information included in the first structure;
   sending, by the application programming interface layer of the hardware, the memory information to a hardware device, and allowing the hardware device to process data in a target memory pool indicated by the memory information.

In above technical solutions, the method further including:
   Providing, by the second application programming interface, the memory information included in the first structure to the upper application, when the upper application invokes the second application programming interface of the application programming interface layer.

In above technical solutions, packaging, by the driver hardware abstraction layer, the memory information to obtain the first structure, includes:
   obtaining, by the driver hardware abstraction layer, a second structure associated with attribute information of an operating system; and
   packaging, by the driver hardware abstraction layer, the second structure to obtain the first structure, the memory information is packaged in the second structure.

An electronic device provided in the embodiment of the present disclosure, including a processor and a memory, the memory stores computer programs that can be run on the processor, and the computer program includes the driver system described above.

A non-volatile computer-readable storage medium provided in the embodiment of the present disclosure, the non-volatile computer-readable storage medium stores the driver system described above.

FIG. 1 is a structural schematic view of a driver system according to an embodiment of the present disclosure. As shown in FIG. 1, a system 10 includes an application programming interface layer 101 of an upper application (APP), a driver hardware abstraction layer 102, a memory allocation management layer 103 and an application programming interface layer of hardware 104.

The application programming interface (API) layer of the upper application may be configured to: provide a general first application programming interface to be invoked by the upper application; and receive a first structure, which is fed back from the driver hardware abstraction layer, in response to the upper application requesting to access a memory. The first structure may be configured to locate a memory region, which is in a shared memory pool of the memory allocation management layer and corresponds to the memory allocated to the upper application.

It should be understood that, the general first API indicates that the first API can be applied generally at all times, regardless of an application type of the upper layer of the driver system and regardless of a hardware device supported by the driver system. For example, codes of the first API of this layer should not be modified when a developer migrates the driver system to support a new hardware device. For another example, when the new hardware device is added to an electronic device where the driver system is installed, the driver system may also be configured as driver of the new hardware device without modifying the codes of the first API of this layer of the system.

In the present embodiment, the API layer of the upper application may receive the first structure, which is fed back from the driver hardware abstraction layer, in response to the upper application requesting to access the memory, and it is determined that the upper application requesting to access the memory from the shared memory pool of the memory allocation management layer is successful. In the embodiment of the present disclosure, the first structure may be known as a first memory node. That is, the upper APP may acquire the memory node through the driver system (also known as driver framework) to process the data of a target memory pool indicated by the memory information through the hardware device by the memory node.

The driver hardware abstraction layer HAL 102 is configured to: implement the communication capability of the first application programming interface, obtain the memory information of the memory allocated to the upper application, and package the memory information to obtain the first structure.

It should be understood that, the API layer 101 of the upper application may mainly be configured to provide a general function interface to be invoked by the upper application. The driver HAL 102 is the concrete implementation of the first API of the upper layer, such as implementing the request of the memory, reading-writing to the memory, releasing the memory, and so on.

The memory allocation management layer 103 is configured to: determine the target memory pool in the shared memory pool, determine the memory requested by the upper application from the target memory pool, and the allocate the memory to the upper application.

In the embodiments of the present disclosure, the memory allocation management layer 103 determining the target memory pool in the shared memory pool may be achieved by the following manners. In a first manner, when the operating system is in an initial power-on operation stage, the target memory pool may be obtained by reserving a memory pool from the shared memory pool. In a second manner, the target memory pool may be obtained by requesting a memory pool from the shared memory pool in advance based on a memory management mode of the operation system. Furthermore, the memory requested by the upper application may be determined from the target memory pool in response to the upper application requesting to access the memory, and the memory may be allocated to the upper application, such that the memory regions corresponding to various applications may be distinguished between each other.

It should be noted that, while determining the target memory pool in the shared memory pool, the memory allocation management layer may alternatively determine the target memory pool based on the determined memory and a reclaimed memory.

The application programming interface layer of the hardware 104 may be configured to obtain the first structure. The application programming interface layer of the hardware 104 may obtain the memory information included in the first structure, and send the memory information to the hardware device, such that the hardware device may process the data in the target memory pool indicated by the memory information.

The data to be processed may be various. For example, the data to be processed may be a picture, a video, and the like, which are received by the upper application. For another example, the data to be processed may be an instruction sent by the upper application.

The memory information may include at least an address information of the memory and a size information of the memory.

For example, based on the driver system provided in the present disclosure, a plurality of upper layer applications may request for memories, for example, a first upper layer application may request for a memory, and a second upper layer application may also request for a memory. The driver HAL 102 may be configured to implement the communication capability of the first application programming interface, obtain the memory information of the memory allocated to the first upper application, and package the memory information to obtain the first structure corresponding to the first upper application. The API layer 101 of the upper application may receive the first structure, which corresponds to the first upper application and is fed back from the driver HAL 102, and determine that the first upper application obtains the memory that is in the shared memory pool of the memory allocation management layer and is requested by the first upper application. The HAL 102 may be configured to implement the communication capability of the first application programming interface, obtain the memory information of the memory allocated to the second upper application, and package the memory information to obtain the first structure corresponding to the second upper application. The API layer 101 of the upper application receives the first structure, which corresponds to the second upper application and is fed back from the driver hardware abstraction layer, and determine that the second upper application obtains the memory that is in the shared memory pool of the memory allocation management layer and is requested by the second upper application. The API layer of the hardware 104 may be configured to acquire the first structure corresponding to the first upper application, obtain the memory information included in the first structure, and send the memory information to the first hardware device, such that the first hardware device may process the data in the target memory pool indicated by the memory information. The API layer of the hardware 104 may be configured to acquire the first structure corresponding to the second upper application, obtain the memory information included in the first structure, and send the memory information to the second hardware device, such that the second hardware device may process the data of the target memory pool indicated by the memory information. That is, different hardware devices may correspond to the first structures of different upper applications, for example, the first hardware device may correspond to the first structure of first upper application, and the second hardware device may correspond to the first structure of second upper application.

The driver system provided in the present disclosure is configured to have various layer. The driver system may include: the application programming interface layer of the upper application, configured to: provide the general first application programming interface to be invoked by the upper application, obtain the first structure, which is fed back from the driver hardware abstraction layer, in response to the upper application requesting to access the memory, the first structure is configured to locate the memory region, which is in a shared memory pool of the memory allocation management layer and corresponds to the memory allocated to the upper application; the driver hardware abstraction layer, configured to: implement the communication capability of the first application programming interface, and obtain the memory information of the memory allocated to the upper application, and package the memory information to obtain the first structure; the memory allocation management layer, configured to: determine the target memory pool in the shared memory pool, determine the memory requested by the upper application from the target memory pool, and allocate the memory to the upper application; the application programming interface layer of the hardware, configured to: obtain the first structure, obtain the memory information included in the first structure, and send the memory information to the hardware device, and allowing the hardware device to process the data in the target memory pool indicated by the memory information. As shown in above description, while the driver system provided in the present disclosure is processing data, only the first structure is sent, and data movement is not performed, such that, for one upper application, the application programming interface layer of the hardware as a bottom layer and the application programming interface layer of the upper application as a upper layer may access the same memory. Furthermore, the driver system may be deployed to different operation systems to achieve the cross-platform deployment. Therefore, the data movement may be reduced, and the development costs and later maintenance costs may be reduced.

FIG. 1 is a structural schematic view of a driver system according to an embodiment of the present disclosure. As shown in FIG. 1, the system 10 may include: the application programming interface layer of the upper application 101, the driver hardware abstraction layer 102, the memory allocation management layer 103, and the application programming interface layer of the hardware 104.

The application programming interface layer of the upper application is configured to provide the general first application programming interface to be invoked by the upper application, obtain the first structure, which is fed back from the driver hardware abstraction layer, in response to the upper application requesting to access the memory, the first structure is configured to locate the memory region, which is in a shared memory pool of the memory allocation management layer and corresponds to the memory allocated to the upper application.

In some embodiments of the present disclosure, the application programming interface layer may further provide the second application programming interface (API) to be invoked by the upper application to check the memory information included in the first structure.

For example, the second application programming interface (API) may be expressed as an ioctl_mem interface, and may be configured to check the memory information included in the first structure. In this way, detailed information, such as the address information and/or the size information, of the memory allocated to the upper application may be quickly obtained.

In some embodiments of the present disclosure, the first application programming interface may include at least the following.

A requesting interface of the memory is configured to support a requesting operation performed on the memory by the hardware device.

A read-write interface of the memory is configured to support a reading and writing operation performed on the memory by the hardware device.

A release interface of the memory is configured to support a releasing operation performed on the memory by the hardware device.

For example, the requesting interface of the memory may be expressed as a Create_mem interface, the read-write interface of the memory may be expressed as a read/write_mem interface, and the release interface of the memory may be expressed as a free_mem interface.

The driver hardware abstraction layer 102 implements the communication capability of the first application programming interface, and obtains the memory information of the memory allocated to the upper application, and packages the memory information to obtain the first structure.

In some embodiments of the present disclosure, a mapping relationship between a virtual address and a physical address may be stored in the first structure, the virtual address is used by the upper application to access the memory allocated to the upper application, and the physical address is used by the hardware device to access the memory allocated to the upper application.

That is, the memory node of the embodiments of the present disclosure is different from a virtual file descriptor in the operating system in the art, and a corresponding parsing process may not be needed for the memory node of the embodiments of the present disclosure. Storing the mapping relationship between the virtual address and the physical address in the structure of the memory node allows the actual memory area to be located more quickly. The memory node of the embodiment of the present disclosure may be suitable for the application scenarios of high-speed communication, and the processing efficiency may be improved.

In some embodiments of the present disclosure, the operation of the driver hardware abstraction layer 102 packaging the memory information to obtain the first structure may include following operations. The driver hardware abstraction layer 102 may obtain a second structure associated with attribute information of the operating system; and package the second structure to obtain the first structure. The memory information is packaged in the second structure.

In some embodiments of the present disclosure, the memory management mode of the operating system may be represented by the attribute information.

In the embodiment of the present disclosure, no matter what kind of operation system is applied, the memory information may always be packaged based on the memory management mode of the operation system to obtain the second structure. The first structure includes more memory information than the second structure does. Furthermore, the memory information included in the second structure may be included in the first structure. Therefore, the driver system provided in the present disclosure may be compatible in multiple systems; in each of the multiple operating systems, the second structure, i.e., the raw information of the operating system, may be acquired based on the first structure, such that an information processing efficiency of each of the multiple operating systems is increased.

In the embodiments of the present disclosure, for example, the operating system may include but is not limited to the Linux operating system, the Android operating system, the Windows operating system, and the RTOS. In an example of the Linux, the Linux may package a shmem to share memory. In an example of the Android, the Android may package an ashmem to share memory. That is, the implementation manners may be various manners in various operating systems. Of course, in the process of implementing some customized operating systems that are different from the known operating systems, such as a memory node, the implementation may be achieved by configuring a vendor interface.

In some embodiments of the present disclosure, the application programming interface layer of the hardware may provide the interprocess communication IPC interface to acquire the first structure.

The communication mode of the IPC interface may be various. For example, the communication mode of the IPC interface may be achieved by socket, message, semaphore, signal, pipe, fifo, mailslot, share memory, and the like. The socket may be configured for interprocess communication between different host devices. The message may be a linked list of information, including an information queue of Posix and an information queue of system V i. The semaphore may be configured for mutual exclusion and synchronization between processes. The signal may be configured to inform occurrence of a process event. The pipe may be configured for communication between processes having an inheritance relationship, where a half-duplex mode is applied, and data is transferring unidirectionally. The FIFO may allow data to be interchanged between unrelated processes. The shared memory refers to a plurality of processes sharing a given storage region.

In some embodiments of the present disclosure, the hardware device may be the artificial intelligence chip.

In the embodiment of the present disclosure, the type of the hardware device will not be limited herein. The type of the hardware device may be various. For example, the hardware device may be the AI chip or other chip with a computing capability. The AI chip may be various. For example, the AI chip may be a neural-network processing unit (NPU), a graphics processing unit (GPU), a field programmable gate array (FPGA), a digital signal processor (DSP), an ASIC, and the like.

The NPU may be a kind of microprocessor of hardware acceleration dedicated to artificial intelligence, especially an artificial neural-network, machine vision, machine learning, and the like. In the implementation of NPU, the computing speed of the neural network may be greatly increased by configuring a dedicated instruction set and a large area of on-chip memory. Further, since instruction set of the NPU includes a plurality of SIMD instructions, a plurality of data may be processed by one instruction, such that computing parallelism may be greatly improved.

The memory allocation management layer 103 may be configured to determine the target memory pool of the shared memory pool, and determine the memory requested by the upper application from the target memory pool, and allocate the memory to the upper application.

The application programming interface layer of the hardware 104 may be configured to obtain the first structure, obtain the memory information included in the first structure, and send the memory information to the hardware device, such that the hardware device may process the data in the target memory pool indicated by the memory information.

An exemplary application of the embodiment of the present application in an actual application scenario will be described below.

The general AI chips may mainly be configured on a terminal and a server, and configured to accelerate computing of the neural network. Designing systems of the AI chip may be various, and different hardware designs may be adapted with different driver software. At present, a system application platform of the AI chip may mainly be the Linux platform of the server and the Android platform of the mobile phone.

In order to allow the AI chips to be compatible with multiple platforms and to achieve a high efficiency at the same time, in the present disclosure, the share memory is configured at the bottom layer, and the communication mode of driver may be configured to have various layers to allow the AI chips to be compatible with multiple platforms:

1. The top layer may be the API layer, and may be configured to provide an invoking interface for the application. The interface includes the application interface of the memory, the read-write interface of the memory, the release interface of the memory, and the like. A corresponding memory node may be returned to when the application obtains the memory that is requested by the application. The memory node may mainly be configured to distinguish different memory regions, including information of each of different memories, such as an address of the memory, a size of the memory, and the like. A plurality of processes having a same memory node may indicate that one memory region is being used, i.e., the shared memory. The API layer further provides an interface such as ioctl_mem to view specific information of the memory node. The memory node may be different from the virtual file descriptor in the operating system in the art, and the corresponding parsing process may not be needed. The mapping relationship between the virtual address and the physical address may be stored in the structure of the memory node. The actual memory region may be located more quickly, and may be beneficial to the application scenarios of the high-speed communication such as the AI chips.

2. The second layer may be concrete implementation of the upper layer of API layer. There are various implementations in various operating systems. For example, the Linux may implement the second layer by packing the shmem to share memory. The Android may implement the second layer by packaging the ashmem to share memory. Of course, for implementations in some customized operating systems that are different from the known operating systems, such as a memory node, the implementations may be achieved by a vendor interface.

3. The third layer may be a definition and management of the entire shared memory pool. No matter which system interface of the second layer is configured to request for the memory, the memory, which is requested and allocated, is always in a specific memory pool. A memory pool may be reserved at the beginning stage of the system, or the request is performed in advance through the memory management. When returning to the shared memory from the memory pool, a unique memory node may be returned to, such that various memory regions may be distinguished from each other.

Figure 2:
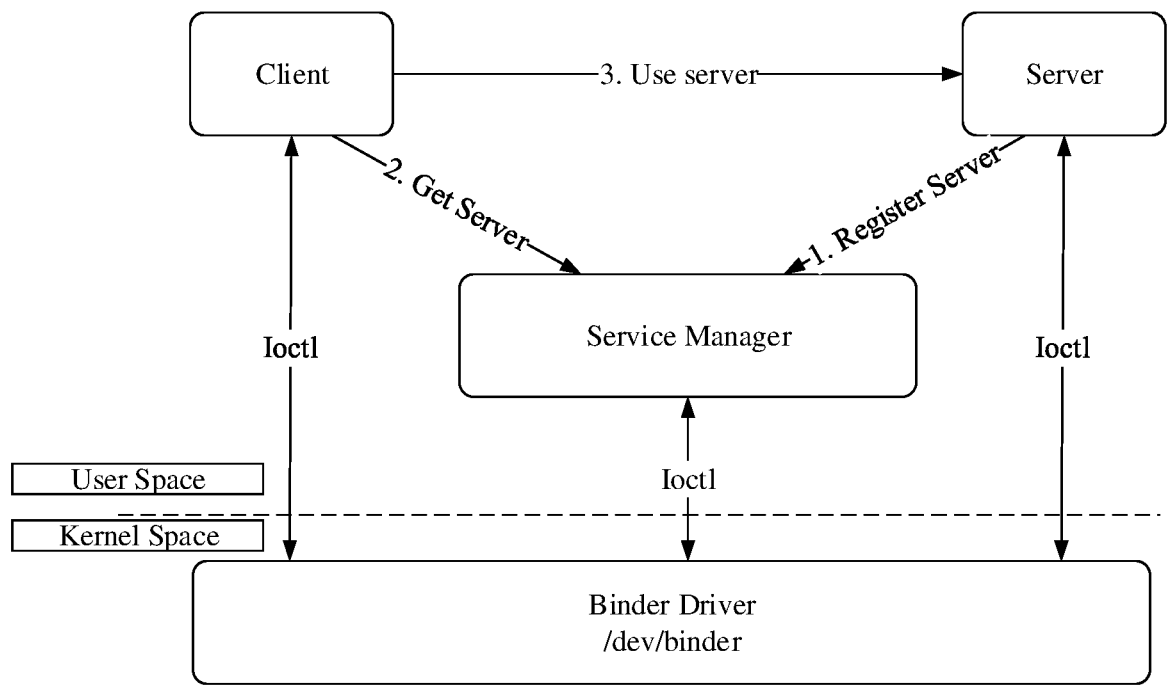
FIG. 2 is a structural schematic view of a driver system of the related art.

4. The lowest layer may be the application programming interface layer of the hardware and is mainly configured to obtain a memory node being the same as the application. The obtaining may be achieved by socket, message, and the like. The memory node of the application layer may be sent to the application programming interface layer of the hardware. The API layer of the hardware may send the address information to the AI chip by obtaining the specific information of the memory inside the memory node, such as the actual physical address. DMA of the AI chip may read and write data from the shared memory region to achieve data transmission. In the entire driver communication process, from a stage that the application requests the memory to a stage that the AI chip uses the memory, the data may always be fixed in the certain region of the shared memory pool. Comparing to Android Binder IPC communication mode in the related art shown in FIG. 2, in the Android Binder IPC communication mode, data may be moved from a client side to a service manager, in this way, the overhead may be increased, and the efficiency may be reduced. However, for the driver system provided in the present disclosure, data movement is never performed, only the memory node, which is a quite small sized data structure, is moved, such that the requirement of high-speed data exchange of AI chips may be satisfied. The hierarchical design may allow the driver system to be compatible with multiple platforms, achieving certain technical effects.

The technical effects of the driver system provided in the present disclosure may be achieved by implementing the technical solutions of the embodiments.

1. The driver communication mode may be compatible with multiple platforms and may coordinate with a complete driver system to allow different AI chips to be accessed quickly, and development costs may be reduced.

2. For the driver communication mode provided in the present disclosure, while the driver system provided in the present disclosure is processing data, only the first structure is sent, and data movement is not performed, such that the requirement of high efficiency of AI chips may be satisfied, and may be an industry-leading technical solution.

3. A same communication mode may be deployed to different system platforms, later maintenance costs and the development costs may be reduced, and the user experience may be improved.

It should be noted that, in the present disclosure, when the above driver system is implemented as a software function module and sold or used as a stand-alone product, the driver system can be stored in a computer-readable storage medium. The technical solution of the embodiments of the present disclosure, which essentially or rather contributes to the relevant art, may be embodied in the form of a software product. The computer software product may be stored in a storage medium and includes a plurality of instructions to enable an electronic device (which may be a mobile phone, a tablet, a laptop, a desktop a computer, a robot, a drone, a sliding screen, and so on) to perform all or a part of the driver system or information processing method described in the above embodiments. The above-mentioned storage media include various media that can store program codes, such as a USB flash drive, a portable hard drive, a Read Only Memory (ROM), a magnetic disk, and an optical disk. In this way, the present disclosure is not limited to any particular combination of hardware and software.

Figure 3:
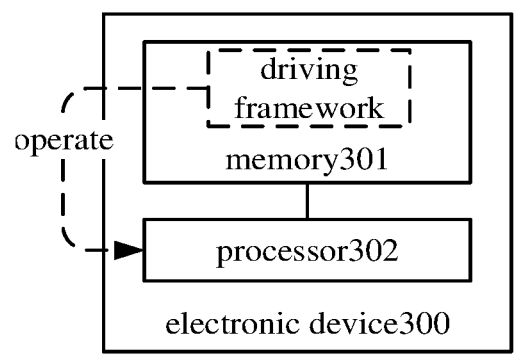
FIG. 3 is a schematic diagram showing a hardware entity of the electronic device according to an embodiment of the present disclosure.

The electronic device may be provided in the embodiment of the present disclosure. As shown in FIG. 3, the electronic device 300 provided in the embodiment of the present disclosure may include: a memory 301 and a processor 302. The memory 301 may store computer programs that can be ran on the processor 302, and the computer program may include the driver system, also known as driver framework, as described in any one of the embodiments.

The memory 301 may be configured to store the instruction and the application, which may be performed by the processor 302, and the data to be processed or the data has been processed (for example, a image data, a video data, a speech communication data, and a video communication data) of each module of the processor 302 and the electronic device 300 may be cached. The operations described above may be achieved by the flash and the random access memory (RAM).

A non-volatile computer-readable storage medium may be provided in the embodiment of the present disclosure, and the non-volatile computer-readable storage medium may store the driver system as described in any one of the embodiments.

It should be noted that, the above descriptions of the non-volatile computer-readable storage medium and the device may be similar to descriptions of the above embodiments of the driver system, and the non-volatile computer-readable storage medium and the device may have the same or similar beneficial effects as those of the embodiments of the driver system. Details that are not disclosed in the non-volatile computer-readable storage medium and the embodiment of the device in the present disclosure may be referred to the description of the embodiment of the driver system in the present disclosure to understand.

Figure 4:
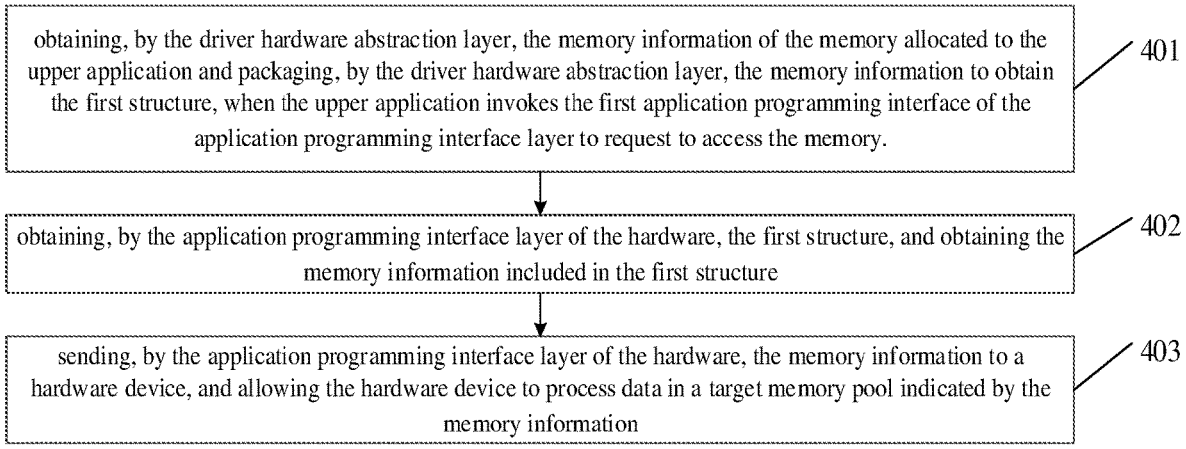
FIG. 4 is a flow chart of an information processing method according to an embodiment of the present disclosure.

An information processing method may be provided in the embodiment of the present disclosure. As shown in FIG. 4, the information processing method may be applied in the driver system described above, the method may include the operation 401 to operation 403.

In an operation 401, the memory information of the memory allocated to the upper application may be obtained by the driver hardware abstraction layer, and the memory information to obtain the first structure may be packaged by the driver hardware abstraction layer when the upper application invokes the first application programming interface of the application programming interface layer to request to access the memory.

In some embodiments, the first structure may be configured to locate the memory region, which is in a shared memory pool of a memory allocation management layer and corresponds to a memory allocated to the upper application.

In the embodiment of the present disclosure, the driver system of the electronic device may obtain the memory information of the memory allocated to the upper application by the driver hardware abstraction layer, and package the memory information to obtain the first structure by the driver hardware abstraction layer, when the upper application of the electronic device invokes the first application programming interface of the application programming interface layer to request to access the memory.

In an operation 402, the first structure may be obtained through the application programming interface layer of a hardware, and the memory information included in the first structure may be obtained.

In the embodiments of the present disclosure, the first structure may be sent to the application programming interface layer of a hardware after the first structure is obtained by the driver system of the electronic device through the application programming interface layer of a hardware. Therefore, the driver system may obtain the first structure through the application programming interface layer of a hardware, and obtain the memory information of the first structure.

In an operation 403, the memory information may be sent to the hardware device through the application programming interface layer of the hardware, and the hardware device may be allowed to process data in the target memory pool indicated by the memory information.

In the embodiments of the present disclosure, there is communication connection between the application programming interface layer of the hardware and the hardware device of the driver system. The driver system may send the memory information to the hardware device through the application programming interface layer of the hardware. Therefore, the hardware device may be allowed to process data in the target memory pool indicated by the memory information. As shown in above description, while the driver system provided in the present disclosure is processing data, only the first structure is sent, and data movement is not performed, such that, for one upper application, the application programming interface layer of the hardware as a bottom layer and the application programming interface layer of the upper application as a upper layer may access the same memory. Furthermore, the driver system may be deployed to different operation systems to achieve the cross-platform deployment. Therefore, the data movement may be reduced, and the development costs and later maintenance costs may be reduced.

The description of the embodiments of the method is similar to the above description of the embodiments of the driver system, and the information processing method may have similar beneficial effects as the embodiments of the driver system. Details that are not disclosed in the embodiments of the present disclosure may be referred to the description of the embodiment of the driver system in the present disclosure to understand.

It should be understood that, "one embodiment", "some embodiments", or "another embodiments" herein means that a particular feature, a structure, or a property described in an embodiment may be included in at least one embodiment of the present disclosure. Therefore, "in one embodiment", or "in a embodiment", or "in some embodiments", "in another some embodiments" appearing in various places in the specification are not necessarily refer to the same embodiment. Furthermore, a particular feature, a structure, or a property may combined in any suitable way in one or more embodiments of the present disclosure. It should be understood that, in the embodiments of the present disclosure, the sequence number of the above processes shall not be interpreted as the order of execution, the sequence number of each process may be determined by function and internal logic, and the implementation process of the embodiments of the present disclosure may not be limited herein. The sequence number of the embodiments of the present disclosure are intended to explain the present disclosure only and shall not be interpreted as merits and demerits of the embodiments of the present disclosure.

It should be noted that, terms "includes", "has", and any variations thereof, are intended to cover non-exclusive inclusion. For example, a process, a method, an object, a device or an apparatus including a series of elements is not limited to the listed elements, but may further include the other elements that are not listed, or may include the fixed elements included in a process, a method, an object, or an apparatus. Without further restrictions, the element defined by the statement "including a" shall not exclude the existence of another identical element in a process, a method, an object or a device that includes the element.

In the embodiments of the present disclosure, it should be understood that, the driver system, the method and the device disclosed herein may be achieved in another way. The embodiments of the driver system described above are intended to schematic only, for example, the division of the layers is a logical function division only.

All layers of the driver system may be integrated in one processing unit in the embodiment of the present disclosure, or each layer may be configured as a unit separately, or two or more layers may be integrated in one unit. The integrated unit may be achieved in the form of hardware or may be achieved in the form of the combination of the hardware and the software function unit.

Those of ordinary skill in the art may understand that all or part of the processes of the above method of embodiments may be implemented by instructing relevant hardware through a computer program. The above-mentioned programs may be stored in the non-volatile computer-readable storage medium. The various layers including the above-mentioned embodiment of the driver system embodiment may be executed when the programming is executed. The above-mentioned storage medium may include: various media that may store program codes, such as a removable storage device, a read only memory (ROM), a magnetic disk, an optical disk, and the like.

The above-mentioned integrated unit in the present disclosure may be stored in the non-volatile computer-readable storage medium when the above-mentioned integrated unit is achieved in the form of software function module and sold or used as an independent product. The technical solution of the embodiments of the present disclosure may be embodied in the form of software products in essence or in part that contributes to related technologies. The computer software product may be stored in a storage medium, including a plurality of instructions, and all or part of the driver system of each embodiment of the present disclosure may be executed by the electronic device (may be a cellphone, a tablet computer, a notebook computer, a desk computer, a robot, a unmanned aerial vehicle, a slide screen, and the like). The above-mentioned storage medium includes: various media that may store program codes, such as a removable storage device, a read only memory (ROM), a magnetic disk, a optical disk, and the like.

The driver disclosed in several embodiments of the driver systems provided in the present disclosure may arbitrarily combined with each other without conflict to obtain the new embodiment of the driver.

The methods disclosed in several embodiments of the method provided in the present disclosure may arbitrarily combined with each other without conflict to obtain the new embodiment of the method.

The features disclosed in several embodiments of the products provided in the present disclosure may arbitrarily combined with each other without conflict to obtain the new embodiment of the product.

The features disclosed in several embodiments of the methods or devices provided in the present disclosure may arbitrarily combined with each other without conflict to obtain the new embodiment of the method or the new embodiment of the device.

The embodiments disclosed above are exemplary only and shall not be interpreted as limiting the scope of the embodiments of the present disclosure. Therefore, any changes or substitutions within the technical scope disclosed in the present disclosure that may be easily thought by those of ordinary skill in the art should be included within the protection scope of the present disclosure.

INDUSTRIAL PRACTICABILITY

The present disclosure provides the driver system, the information processing method, the electronic device, and a storage media. The driver system may include: the application programming interface layer of the upper application, configured to: provide the general first application programming interface to be invoked by the upper application, obtain the first structure, which is fed back from the driver hardware abstraction layer, in response to the upper application requesting to access the memory, the first structure is configured to locate the memory region, which is in a shared memory pool of the memory allocation management layer and corresponds to the memory allocated to the upper application; the driver hardware abstraction layer, configured to: implement the communication capability of the first application programming interface, and obtain the memory information of the memory allocated to the upper application, and package the memory information to obtain the first structure; the memory allocation management layer, configured to: determine the target memory pool in the shared memory pool, determine the memory requested by the upper application from the target memory pool, and allocate the memory to the upper application; the application programming interface layer of the hardware, configured to: obtain the first structure, obtain the memory information included in the first structure, and send the memory information to the hardware device, and allowing the hardware device to process the data in the target memory pool indicated by the memory information. As shown in above description, while the driver system provided in the present disclosure is processing data, only the first structure is sent, and data movement is not performed, such that, for one upper application, the application programming interface layer of the hardware as a bottom layer and the application programming interface layer of the upper application as a upper layer may access the same memory. Furthermore, the driver system may be deployed to different operation systems to achieve the cross-platform deployment. Therefore, the data movement may be reduced, and the development costs and later maintenance costs may be reduced.

What is claimed is:

1. An information processing method, applied by a driver system, the method comprising:
providing, by an application programming interface layer of an upper application, a general first application programming interface to be invoked by the upper application; obtaining, by the application programming interface layer of the upper application, a first structure, which is fed back from a driver hardware abstraction layer, in response to the upper application requesting to access a memory, wherein the first structure is configured to locate a memory region, which is in a shared memory pool of a memory allocation management layer and corresponds to a memory allocated to the upper application;

implementing, by the driver hardware abstraction layer, a communication capability of the first application programming interface; obtain, by the driver hardware abstraction layer, memory information of the memory allocated to the upper application; and packaging, by the driver hardware abstraction layer, the memory information to obtain the first structure;

determining, by the memory allocation management layer, a target memory pool in the shared memory pool; determining, by the memory allocation management layer, the memory requested by the upper application from the target memory pool; and allocating, by the memory allocation management layer, the memory to the upper application; and obtaining, by the application programming interface layer of the hardware, the first structure; obtaining, by the application programming interface layer of the hardware, the memory information included in the first structure; and sending, by the application programming interface layer of the hardware, the memory information to a hardware device to allow the hardware device to process data in the target memory pool indicated by the memory information.

2. The method according to claim 1, wherein the first structure stores a mapping relationship between a virtual address and a physical address, the virtual address is used by the upper application to access the memory allocated to the upper application, and the physical address is used by the hardware device to access the memory allocated to the upper application.

3. The method according to claim 1, further comprising: providing, by the application programming interface layer, a second application programming interface to be invoked by the upper application to view the memory information included in the first structure.

4. The method according to claim 1, wherein the first application programming interface further comprises at least:
a requesting interface of the memory, configured to support a requesting operation performed on the memory by the hardware device;
a read-write interface of the memory, configured to support a reading and writing operation performed on the memory by the hardware device; and
a release interface of the memory, configured to support a releasing operation performed on the memory by the hardware device.

5. The method according to claim 1, wherein the packaging the memory information to obtain the first structure, comprises: obtaining, by the driver hardware abstraction layer, a second structure associated with attribute information of an operating system; packaging, by the driver hardware abstraction layer, the second structure to obtain the first structure, wherein the memory information is packaged in the second structure.

6. The method according to claim 5, wherein the attribute information represents a memory management mode of the operating system.

7. The method according to claim 1, wherein the application programming interface layer of the hardware provides an inter-process communication interface to obtain the first structure.

8. The method according to claim 1, wherein the hardware device is an artificial intelligence chip.

9. An electronic device, comprising a processor and a memory, wherein the memory stores computer programs that can be run on the processor, and the computer program, when being run, is configured to perform operations of:
providing, by an application programming interface layer of an upper application, a general first application programming interface to be invoked by the upper application; obtaining, by the application programming interface layer of the upper application, a first structure, which is fed back from a driver hardware abstraction layer, in response to the upper application requesting to access a memory, wherein the first structure is configured to locate a memory region, which is in a shared memory pool of a memory allocation management layer and corresponds to a memory allocated to the upper application;

implementing, by the driver hardware abstraction layer, a communication capability of the first application programming interface; obtain, by the driver hardware abstraction layer, memory information of the memory allocated to the upper application; and packaging, by the driver hardware abstraction layer, the memory information to obtain the first structure;

determining, by the memory allocation management layer, a target memory pool in the shared memory pool; determining, by the memory allocation management layer, the memory requested by the upper application from the target memory pool; and allocating, by the memory allocation management layer, the memory to the upper application; and obtaining, by the application programming interface layer of the hardware, the first structure; obtaining, by the application programming interface layer of the hardware, the memory information included in the first structure; and sending, by the application programming interface layer of the hardware, the memory information to a hardware device to allow the hardware device to process data in the target memory pool indicated by the memory information.

10. The electronic device according to claim 9, wherein the first structure stores a mapping relationship between a virtual address and a physical address, the virtual address is used by the upper application to access the memory allocated to the upper application, and the physical address is used by the hardware device to access the memory allocated to the upper application.

11. The electronic device according to claim 9, wherein the computer program, when being run, is further configured to perform operations of:
providing, by the application programming interface layer, a second application programming interface to be invoked by the upper application to view the memory information included in the first structure.

12. The electronic device according to claim 9, wherein the first application programming interface further comprises at least:

a requesting interface of the memory, configured to support a requesting operation performed on the memory by the hardware device;

a read-write interface of the memory, configured to support a reading and writing operation performed on the memory by the hardware device; and a release interface of the memory, configured to support a releasing operation performed on the memory by the hardware device.

13. The electronic device according to claim 9, wherein while packaging the memory information to obtain the first structure, the computer program, when being run, is further configured to perform operations of: obtaining, by the driver hardware abstraction layer, a second structure associated with attribute information of an operating system; packaging, by the driver hardware abstraction layer, the second structure to obtain the first structure, wherein the memory information is packaged in the second structure.

14. The electronic device according to claim 13, wherein the attribute information represents a memory management mode of the operating system.

15. The electronic device according to claim 9, wherein the application programming interface layer of the hardware provides an inter-process communication interface to obtain the first structure.

16. The electronic device according to claim 9, wherein the hardware device is an artificial intelligence chip.

17. A non-transitory computer-readable storage medium, wherein the non-transitory computer-readable storage medium having stored therein instructions that, when executed by an electronic device, cause the electronic device to perform operations of:

providing, by an application programming interface layer of an upper application, a general first application programming interface to be invoked by the upper application; obtaining, by the application programming interface layer of the upper application, a first structure, which is fed back from a driver hardware abstraction layer, in response to the upper application requesting to access a memory, wherein the first structure is configured to locate a memory region, which is in a shared memory pool of a memory allocation management layer and corresponds to a memory allocated to the upper application;

implementing, by the driver hardware abstraction layer, a communication capability of the first application programming interface; obtain, by the driver hardware abstraction layer, memory information of the memory allocated to the upper application; and packaging, by the driver hardware abstraction layer, the memory information to obtain the first structure;

determining, by the memory allocation management layer, a target memory pool in the shared memory pool; determining, by the memory allocation management layer, the memory requested by the upper application from the target memory pool; and allocating, by the memory allocation management layer, the memory to the upper application; and obtaining, by the application programming interface layer of the hardware, the first structure; obtaining, by the application programming interface layer of the hardware, the memory information included in the first structure; and sending, by the application programming interface layer of the hardware, the memory information to a hardware device to allow the hardware device to process data in the target memory pool indicated by the memory information.

18. The non-transitory computer-readable storage medium according to claim 17, wherein the first structure stores a mapping relationship between a virtual address and a physical address, the virtual address is used by the upper application to access the memory allocated to the upper application, and the physical address is used by the hardware device to access the memory allocated to the upper application.

19. The non-transitory computer-readable storage medium according to claim 17, wherein the instructions, when executed by an electronic device, cause the electronic device further to perform operations of: providing a second application programming interface to be invoked by the upper application to view the memory information included in the first structure.

20. The non-transitory computer-readable storage medium according to claim 17, wherein the first application programming interface further comprises at least:

a requesting interface of the memory, configured to support a requesting operation performed on the memory by the hardware device;

a read-write interface of the memory, configured to support a reading and writing operation performed on the memory by the hardware device; and a release interface of the memory, configured to support a releasing operation performed on the memory by the hardware device.

* * * * *